United States Patent Office 3,798,287
Patented Mar. 19, 1974

3,798,287
METHOD FOR PRODUCING A MIXED POLYMER OF VINYLIDENE FLUORIDE POLYMERS
Naohiro Murayama, Toshio Hosokawa, and Morio Shirai, Iwaki, Japan, assignors to Kureha Kagaku Kogyo Kabushiki Kaisha, Tokyo-to, Japan
No Drawing. Filed July 25, 1972, Ser. No. 274,983
Claims priority, application Japan, July 26, 1971, 46/55,873
Int. Cl. C08d 9/08; C08f 29/22
U.S. Cl. 260—878 R
5 Claims

ABSTRACT OF THE DISCLOSURE

A method of producing a mixed polymer of vinylidene fluoride having excellent crystallization characteristic, wherein a monomer which is polymerizable by itself without reacting with the resulting polyvinylidene fluoride is added to and polymerized by itself within or on the surface of the vinylidene fluoride polymer particles.

BACKGROUND OF THE INVENTION

This invention relates generally to vinylidene fluoride polymers and to the production thereof, and, more particularly, to an improved method of producing mixed polymers of vinylidene fluoride having excellent crystallization characteristics.

It is well known that the behavior of the crystallization of a crystalline high molecular substance can be made variable by admixing thereto various kinds of nucleating agents.

In the case of polyvinylidene fluoride (hereinafter referred to as "PVDF") also, acceleration of the crystallization speed as well as diminished sphericity of the polymer particles have been attained by dispersing and mixing a nucleating agent such as flavanthrone therein.

As the ordinary mixing processes, there are those such as (a) a method of dissolving polymer in a solvent and re-depositing said polymer together with a nucleating agent; (b) a method of cosalting-out emulsion latex together with a nucleating agent; (c) and a mechanical method such as a rolling method and an extruding method. These methods, however, have hitherto resulted in polymer products having considerably non-uniform mixing from the micro-analytical point of view. Also, the methods of re-depositing and co-salting-out are liable to introduce impurities into the resultant product, and are not easy in their operations.

On the other hand, there is another method of mixing the polymers by dipping the PVDF powder into a solution of a substance which is soluble in a suitable solvent and then drying the dipped powder. This method utilizes the large surface area and micro-pore structure of the polymer particles of VDF. In this case, inorganic compounds such as KCl and NaCl have been proposed as nucleating agents.

For instance, an inorganic salt such as KCl is dissolved in a mixed solvent prepared from water and a suitable organic solvent such as methanol, and a suspended polymer of PVDF dipped in the resultant solution. After impregnation of a solution prepared by the inorganic salt such as KCl into the micro-pores of the polymer, filtration and drying are carried out, whereby crystals of KCl and the like are finely and uniformly dispersed to obtain a resultant product which is suitable for use as the nucleating agent.

However, the crystal nucleating agent of PVDF prepared by an inorganic salt is disadvantageous in that it is liable to be separated in the case of melt-extrusion, hence its effectiveness as a nucleating agent is sometimes lost. Also, due to the hydrophilic character thereof, the electric characteristics of PVDF is lowered by moisture absorption.

The present inventors have strenuously conducted researches and studies in connection with the nucleating agents and dispersion methods for a long period of time, as the result of which they arrived at the present invention.

SUMMARY OF THE INVENTION

It is an essential object of the present invention to provide a method of producing a mixed polymer of vinylidene fluoride having improved crystallization characteristics without being accompanied by the various disadvantages involved in the conventional methods as described above.

The above and other objects of the invention have been attained, according to the invention, by a method of producing a mixed polymer of polyvinylidene fluoride having improved crystallization characteristics, which comprises the steps of preparing vinylidene fluoride polymer particles by subjecting monomeric vinylidene fluoride to suspension- or emulsion-polymerization, and subsequently adding to said vinylidene fluoride polymer thus obtained a monomer which is polymerizable by itself and does not react with the vinylidene fluoride polymer to cause it to polymerize by itself within or on the surfaces of said vinylidene fluoride polymer particles in the presence of a polymerization catalyst, the polymer resulted from this polymerizable monomer producing no solid-solution with the vinylidene fluoride polymer particles, thereby producing a mixed polymer having a crystallization temperature higher than that of said vinylidene fluoride polymer.

In other words, according to the invention, after subjecting vinylidene fluoride monomer (VDF) to polymerization, an other monomer which is polymerizable by itself and does not react with the resultant vinylidene fluoride polymer (PVDF) is added to and polymerized by itself within or at least on the surface of the vinylidene fluoride polymer particles.

DETAILED DESCRIPTION OF THE INVENTION

The nature and details of the present invention will become more apparent from the following description of the invention.

According to the method of the present invention, the polymerizate becomes an effective nucleating agent, since the primary particles resulted from the post-polymerization are very fine and the PVDF particles and latex have an extremely large number of micro-pores and large surface area respectively. After the polymerization of VDF has advanced to a certain stage, the unreacted VDF monomer is discharged out and the other monomer is supplementally added to cause the post-polymerization.

In the present invention, as the product is produced by carrying out the uniform post-polymerization reaction on the micro-pores in the suspension-polymerized PVDF particles or on the surface of the emulsion-polymerized PVDF latex particles, very little impurities are occluded within the polymer particles during the mixing operation and very little time is needed to produce the final product.

Residual catalyst remaining in VDF polymerizate is very useful for obtaining the uniform mixed polymer by the post-polymerization.

In the case of the suspension-polymerization, there takes place a rise in the apparent density (g./cc.) due to the post-polymerization, although change in the particle size of the polymer is almost unobservable. This fact induces us to consider that the polymerization took place within the micro-pores. Also, this fact apparently means that, while the oil-soluble residual catalyst exists on the surface of the suspension-polymerizate, as the polymer is of a micro-porous structure having a large surface area, the residual catalyst exists in the micro-pores.

In the case of the emulsion-polymerization, too, when the post-polymerization is carried out without replenishing the emulsion with an emulsifier, the particle size of the latex, through an electron-microphotography, was found not to contain additional fine particles, but, rather, the particle size of the existing particles became larger in comparison with that prior to post-polymerization.

From these facts, it can be said that at the time of the post-polymerization, that it is not advisable to add an emulsifier.

Further, depending on the circumstances, it is also possible to cause the monomer used in the post-polymerization to be adsorbed on the filtered PVDF powder particles after termination of the polymerization, and then to cause polymerization within the particles by aid of the catalyst remaining in the PVDF.

However, since some effects can still be observed even when the polymer mixture is non-uniform, the polymerization catalyst and emulsifier may be newly added in the case of the post-polymerization.

In the present invention, for the monomer to be supplementally added afterward, any monomer which is polymerizable by itself and does not react with the vinylidene fluoride polymer may be used as long as the polymer thereof forms a crystal nucleus at the temperature of crystallization of the PVDF. In general, the polymer which has been produced from such monomer has a crystallization temperature higher than that of the PVDF and does not produce a stable solid-solution with PVDF at any ratio is considered preferable. More preferably, a fluorine type monomer is desirable as a substance which does not deteriorate the physical properties of the PVDF.

Examples of the fluorine type monomers are vinyl fluoride (VF), chlorotrifluoroethylene (CTFE), tetrafluoroethylene (TFE), which can be used simply or as mixtures thereof. Depending on the case, it is possible to use a copolymer of any of these fluorine type monomers with another monomer such as VDF, ethylene, hexafluoropropylene, and so forth which is polymerizable with the fluorine type monomer. However, in the case of the copolymerization, it is desirable that the crystallization temperature of the copolymer and the compatibility with the PVDF be so selected that they may conform to the afore-mentioned conditions.

A suitable quantity of the afore-mentioned fluorine type monomer to be polymerized within or on the surface of the PVDF particles to be used as the nucleating agent is between 0.1% and 30% by weight, although it is possible to use a greater quantity of the monomer in case other effects are desired, such as utilization of the lubricating properties of tetrafluoroethylene.

Further, as the suspension-polymerized PVDF has a microporous structure, its apparent density is from 0.3 to 0.4 g./cc. in case no post-polymerization is carried out. However, it is of course possible to increase the apparent density through the post-polymerization according to the present invention, and it is also possible to adjust the apparent density as desired by suitably selecting the quantity of the monomer to undergo the post-polymerization.

The supplemental addition of other kinds of monomer in the present invention is generally carried out in such a manner that, when the polymerization of vinylidene fluoride reaches an expected yield, the remaining VDF monomer is discharged out and thereafter the monomer to be post-polymerized is added. However, when a monomer mixture of VDF and the other monomer is to be post-polymerized with the PVDF, there is no need of discharging the remaining VDF monomer.

The method of the present invention is almost the same as the operation involved in a homopolymerization of VDF, except for the polymerization of the after-charged monomer into the polymerization vessel upon completion of the VDF polymerization. Accordingly, the operation can be easily carried out, and there is no possibility of inclusion of impurities. The temperature for the post-polymerization may be the same as in the case of the VDF polymerization, but for shortening the time period for the post-polymerization, the temperature may be made higher. For example, in case the post-polymerization is carried out by adding vinyl fluoride or tetrafluoroethylene after vinylidene fluoride has been polymerized by the suspension-polymerization in a water-vessel at 25° C., there is no large difference as to whether the post-polymerization is carried out by raising the temperature of the water-vessel to 35° C., or whether it is carried out at the same temperature, namely 25° C.

Polyvinyl fluoride (PVF) and polytetrafluoroethylene (PTFE) are crystalline, and their crystallization temperatures are higher than that of the PVDF, so that their uniform mixture with the PVDF produced by the post-polymerization has the effect of increasing the crystallization temperature of the PVDF. Furthemore, both PVF and PTFE are not so compatible with the PVDF, and even if they are compatible, they can be phase-separated at the time of solidification, hence they are the preferred crystal nucleating agents.

In general, the melt-press plate made of a homopolymer of vinylidene fluoride becomes non-transparent because of development of large spherulites, and distortion is usually produced on the surface of the spherulites.

According to the present invention, extremely fine crystals can be produced rapidly around a nucleating agent as a core, so that crystals having a crystallization temperature higher by 10 to 20° C. are obtained in some cases and it is possible to obtain shaped articles having good transparency and small distortion. For example, PVF functions effectively as a specially excellent crystal nucleus, and shaped articles made by a melt-press operation can also be obtained in the transparent state. In this case, it has been confirmed by X-ray diffraction that one portion or major portion of the PVDF crystals is of $\beta$ type, and in the case where $\beta$ type crystals are numerous, the effect of transparency is particularly remarkable. On the other hand, melt-pressed shaped articles of PVDF which has not been subjected to the post-polymerization are of the $\alpha$ type alone, and no $\beta$ type crystals can be found. From this fact, it is recognized that PVF has not only an effect useful as a crystal nucleus but also an effect of promoting the production of the $\beta$ type crystal.

Particularly, in the present invention, the polymer particle itself is a powder having a crystal nucleus, so that it can be used as it is as a powder lining or organosol. Further, the polymer which has been post-polymerized within the micro-pores of the PVDF, or on the surface thereof does not cause layer-separation even under a processing condition such as melt-extrusion, etc. Also, as the polymer is dispersed in the molten PVDF, its effect as the crystal neucleating agent is never lost, even in the case of carrying out the extrusion-molding.

According to the present invention, excellent shaped articles can be obtained without impairing the physical properties of the PVDF by appropriate utilization of the abovementioned characteristics features, so that it can be applied to a wide range of industrial fields.

The present invention will be more specifically described in connection with the following examples, but is not intended to be limited thereto.

Example 1

600 cc. of water, 0.6 g. of methyl cellulose, and 2.0 g. of normal propyl-peroxydicarbonate were charged into a stainless steel autoclave of 1 l. capacity. After the interior of the autoclave was flushed several times with the VDF monomer, 200 g. of VDF monomer was charged into the autoclave, and the whole batch was stirred, while the autoclave was being kept in a water vessel at 25° C., whereby the suspension-polymerization was carried out. After this suspension-polymerization was continued for 26 hours, the polymerization pressure within the autoclave became 22.0 kg./cm.², whereupon the remaining VDF monomer was gradually discharged, and immediately thereafter, vinyl fluoride monomer was added from another autoclave into the autoclave so as to adjust the polymerization pressure within the autoclave to 14.0 kg./cm.². After the polymerization was conducted for 16.5 hours with the autoclave kept in the water vessel at 25° C., the pressure was decreased to 6.5 kg./cm.². Then, the remaining vinyl fluoride monomer was discharged, and the polymer was taken out of the autoclave, washed with water, and dried, whereby 180 g. of white powder was obtained. When properties of this white powder was measured with the differential scanning type calorimeter (DSC–IB) made by Parken-Elmer, the following results were obtained.

Rate of temperature rise and fall _____° C./min__ 4
Melting temperature _____° C__ 174.9
Crystallization temperature _____° C__ 156.4

As a reference, when PVDF powder was subjected to measurement by the calorimeter, the following results were obtained.

° C.
Melting temperature _____ 178.0
Crystallization temperature _____ 136.0

Thus, it was found that the crystallization temperature of the powder according to the present invention was higher by about 20° C. than that of the PVDF powder.

Next, a plate having a thickness of 1 mm. was shaped from the above-described powder according to the present invention by means of a heat press at 220° C.

Transparency of this plate was evaluated by utilizing a haze-meter of integrating type, whereby the following results were obtained.

Percent
Dispersed light transmission ($T_d$) _____ 13.3
Parallel light transmission ($T_p$) _____ 50.0
Haze value (H) _____ 21.1

In the same manner as described above, the reference PVDF powder was shaped into a plate of the same thickness as above, and properties of the plate were measured, whereby the following results were obtained.

Percent
Dispersed light transmission ($T_d$) _____ 86.9
Parallel light transmission ($T_p$) _____ 12.0
Haze value (H) _____ 87.9

From the above results, it is apparent that the transparency of the shaped plate according to the present invention is greatly improved. As a result of observation by X-ray diffraction, the crystal structure of the plate was found to be abundant in the α type.

Example 2

After VDF was subjected to the suspension-polymerization, the resulted polymer was filtrated to perfectly remove the residual VDF monomer. 40 g. of this undried polymer powder was charged into an autoclave together with 30 cc. of water and 0.03 g. of methyl cellulose, and a post-polymerization was conducted in a water vessel at 250° C. by adding to the reaction system vinyl fluoride monomer. The weight ratio of the vinyl fluoride post-polymerized with the PVDF was approximately 20%.

In the same manner as described above, a press plate was shaped and its transparency was measured, whereby the following results were obtained.

Percent
Dispersed light transmission ($T_d$) _____ 16.1
Parallel light transmission ($T_p$) _____ 18.9
Haze value (H) _____ 46.0

As a result of observation of the press plate by X-ray diffraction, it was found that crystal structure thereof was substantially of β type.

Example 3

In the same manner as in Example 1, after polymerization of 200 g. of VDF monomer, the remaining VDF monomer was discharged, and then 61 g. of tetrafluoro-ethylene monomer was added, whereupon the polymerization pressure became 220 kg./cm.². Then, the process batch was subjected to polymerization with agitation for 19 hours in a water vessel at 25° C. When the polymerization pressure became 0.5 kg./cm.², the product was taken out of the autoclave, and the powder precipitated in water was washed with water, filtrated, and dried, whereby 233 g. of white powder was obtained. It was found that 40 g. of homopolymer had been formed simultaneously as an emulsion in the water.

The powder thus produced which has been polymerized in the polymer particles was washed with water, and dried, after which it was subjected to measurement of crystallization temperature thereof, whereby the following results were obtained.

° C.
Melting temperature _____ 175.0
Crystallization temperature _____ 151.2

As a result of this experiment, it was found that the crystallization temperature had been improved by about 15° C.

Example 4

In the same manner as in Example 1, after 200 g. of VDF monomer was polymerized, the remaining VDF monomer was discharged, and then 40 g. of chloro-trifluoro-ethylene was added under pressure. Subsequently, the batch was subjected to the post-polymerization for 10 hours, while maintaining the reaction temperature at 25° C. The polymer thus obtained was pure white powder and the post-polymerized polychlorotrifluoro-ethylene contained in the polymer was 9%. This resin had a crystallization temperature of 149° C., i.e., the crystallization temperature thereof was improved by 13° C.

Example 5

180 g. of undried powder of suspension-polymerized VDF and 500 cc. of water were placed in a stainless steel autoclave of 1 l. capacity, which was thoroughly substituted for nitrogen. Then, 32 g. of ethylene tetrafluoride and 8 g. of VDF monomer were added under pressure, and the resulting mixture was subjected to the post-polymerization for 10 hours, while maintaining the reaction temperature at 25° C.

The slurry thus obtained was washed with water and dried to be rendered into excellent powder. The quantity of the polymerized product finally obtained was 210 g. A plate of a thickness of 1 mm. shaped from this resin powder had the following properties.

(a) Transparency higher than that of the plate shaped from PVDF only.
(b) Melting temperature—174° C.
(c) Crystallization temperature—151° C.

Accordingly, the crystallization temperature was improved by 15° C.

What is claimed is:

1. A method for producing a polymer composition containing polyvinylidene fluoride and another fluorine-containing polymer such that the mixture has a crystallization temperature higher than that of the polyvinylidene fluoride, and wherein the fluorine-containing polymer does not form a solid solution with the polyvinylidene fluoride which comprises: subjecting monomeric vinylidene fluoride to suspension- or emulsion-polymerization to produce polyvinylidene fluoride particles, charging the vinylidene fluoride polymer thus-produced with a fluorine-containing monomer selected from the group consisting of vinyl fluoride, tetrafluoroethylene, and chloro-trifluoro-ethylene, and mixtures thereof, and post polymerizing the after-charged monomer adsorbed on the surface of the vinylidene fluoride polymer particles or present within the micro-pores of the polymer, said post-polymerization being carried out in the presence of the residual catalyst remaining on the surface or within the micro-pores of the polymer particles, thereby producing a mixed polymer having a crystallization temperature higher than that of said vinylidene fluoride polymer.

2. The method as defined in claim 1, wherein said monomer is added to said vinylidene fluoride polymer particles after filtration, and then subjected to the post-polymerization with the polymer particles by the assistance of the residual catalyst within the vinylidene fluoride polymer particles.

3. The method as defined in claim 1, wherein a required quantity of the catalyst for the post-polymerization is added to said vinylidene fluoride polymer particles at the time of said post-polymerization reaction.

4. A method according to claim 3 wherein vinylidene fluoride polymer is charged with another monomer copolymerizable with said fluorine-containing monomer and subsequently post-polymerized.

5. A method according to claim 3 wherein the monomer copolymerizable with said fluorine-containing monomer is selected from the group consisting of vinylidene fluoride, ethylene, and hexafluoro propylene.

References Cited

UNITED STATES PATENTS

| | | | |
|---|---|---|---|
| 3,257,334 | 6/1966 | Chon et al. | 260—21 |
| 3,253,057 | 5/1966 | Landler | 260—877 |
| 3,580,829 | 5/1971 | Lanza | 204—159.17 |

JOHN C. BLEUTGE, Primary Examiner

R. B. TURER, Assistant Examiner

U.S. Cl. X.R.

260—884, 897 C, 900